United States Patent [19]

Yasui

[11] Patent Number: 4,516,137

[45] Date of Patent: May 7, 1985

[54] THERMAL PRINT HEAD FOR HEAT OR NON-HEAT-SENSITIVE PAPER

[75] Inventor: Tsuneo Yasui, Nagoya, Japan

[73] Assignee: Brother Kogyo Kabushiki Kaisha, Nagoya, Japan

[21] Appl. No.: 564,311

[22] Filed: Dec. 22, 1983

[30] Foreign Application Priority Data

Dec. 28, 1982 [JP] Japan ............................... 57-231008

[51] Int. Cl.[3] ............................................ G01D 15/10

[52] U.S. Cl. ................................ 346/76 PH; 400/120

[58] Field of Search ......................... 346/76 R, 76 PH; 400/120, 124, 125, 191, 231, 233, 249, 214, 219.1; 214/216 PH; 318/6; 101/336; 250/316.1, 317.1, 318, 319

[56] References Cited

U.S. PATENT DOCUMENTS 4,025,830 5/1977 Delaporte .............................. 318/6

4,091,913 5/1978 Ku et al. ............................ 400/124

OTHER PUBLICATIONS

IBM Technical Disclosure Bulletin, vol. 27, No. 6, Nov. 1984, pp. 3645-3647.

*Primary Examiner*—E. A. Goldberg

*Assistant Examiner*—A. Evans

*Attorney, Agent, or Firm*—Browdy and Neimark

[57] ABSTRACT

A printer having a thermal print head capable of printing directly on heat-sensitive paper, and printing on non-heat-sensitive paper through a thermal ribbon. The printer comprises a carriage drive circuit for moving the thermal print head along a platen for printing each line of characters, and a detector for sensing the thermal ribbon to check if the thermal ribbon is usable or not. The printer further comprises a control device responsive to a signal from the detector, for selecting, while the thermal ribbon is sensed, a unidirectional printing mode in which the printing movements of the thermal print head take place in a predetermined one of the opposite longitudinal directions of the platen, and selecting, while the thermal ribbon is not sensed, a bidirectional printing mode in which the printing movements take place in either one of the opposite longitudinal directions.

6 Claims, 7 Drawing Figures

THERMAL PRINT HEAD FOR HEAT OR NON-HEAT-SENSITIVE PAPER

BACKGROUND OF THE INVENTION

The present invention relates to a thermally printing apparatus having a thermal print head which effects a printing operation through heat transfer.

In a commonly known thermally printing apparatus for printing on sheets of paper of an ordinary kind, i.e., non-heat-sensitive paper, a printing operation is achieved by a thermal print head through a thermal ribbon (accommodated in a cassette) having a thermally transferable ink layer. In such thermal printer, the thermal head is moved for printing along a paper supporting platen while it is held in pressed contact, via the thermal ribbon, with the printing surface of the paper placed on the platen. Consequently, a relative movement between the paper and the thermal ribbon, if any, would cause a friction between an ink layer of the ribbon and the printing surface of the paper sheet, thus resulting in undesired adhesion of an ink to the printing surface of the paper being printed. For this reason, a thermal printing is effected without such relative movement of the thermal ribbon with the paper, and accordingly the printing movements along the platen are adapted to take place in one fixed direction.

When a thermal printing is executed by a thermal print head directly on a sheet of heat-sensitive paper without using the thermal ribbon, there is no such possibility of undesired ink adhesion to the paper as described above. In this case, therefore, a bidirectional printing is preferable to a unidirectional printing, for increased printing efficiency.

SUMMARY OF THE INVENTION

Accordingly, it is an object of the present invention to provide a printing apparatus having a thermal print head, which is capable of performing both unidirectional printing on a non-heat-sensitive paper sheet through use of a thermally transferable ink ribbon in one fixed direction for all printing motions, and bidirectional printing directly on a heat-sensitive paper sheet in opposite directions without using the ink ribbon.

According to the present invention, there is provided a printing apparatus which has a thermal print head movable along a platen and which is adapted to hold a thermal ribbon having a thermally transferable ink layer, wherein a printing on a sheet of non-heat-sensitive paper is effected by the thermal print head through the thermal ribbon, while a printing on a sheet of heat-sensitive paper is effected directly by the thermal print head without using the thermal ribbon. This printing apparatus comprises: a drive circuit for moving the thermal print head along the platen in selected one of opposite longutidinal directions of the platen upon each printing movement for printing each line of characters on the paper; detector means for sensing the presence of the thermal ribbon at its predetermined position for checking if the thermal ribbon is usable or not, the detector means generating a signal according to the presence and absence of the thermal ribbon at the predetermined position; and control means, responsive to the signal from the detector means, for selecting a unidirectional printing mode in which the printing movements of the thermal print head take place in a predetermined one of the opposite logitudinal directions of the platen for all lines of characters to be printed, or a bidirectional printing mode in which the printing movements of the same may take place in either one of the opposite longitudinal directions, the control means controlling the drive circuit to operate in the unidirectional printing mode while the thermal ribbon is sensed by the detector means, and to operate in the bidirectional printing mode while the thermal ribbon is not sensed by the detector means.

The most salient feature of the printing apparatus constructed as described above is an automatic change of its printing mode between the unidirectional and bidirection printing modes, by the control means which selectively establishes the appropriate printing mode according to the signal from the detector means which senses the thermal ribbon to check if it is to be used or not. A printing operation on a sheet of ordinary non-heat-sensitive paper in the unidirectional printing mode is effected without adhesion of an ink to the paper. Further, a printing operation on a sheet of heat-sensitive paper is achieved in the bidirectional printing mode, whereby the printing efficiency is increased, as compared with that of a printing accomplished in a unidirectional mode which is used also for a printing on heat-sensitive paper in the prior art.

BRIEF DESCRIPTION OF THE DRAWINGS

The above and other objects, features and advantages of the present invention will become more apparent from reading the following description of the preferred embodiment taken in connection with the accompanying drawings in which:

FIG. 2(*b*) is also an enlarged cross sectional view of the same apparatus, showing the thermal print head while it is located away from the platen;

DETAILED DESCRIPTION OF THE PREFERRED EMBODIMENT

Figure 1:
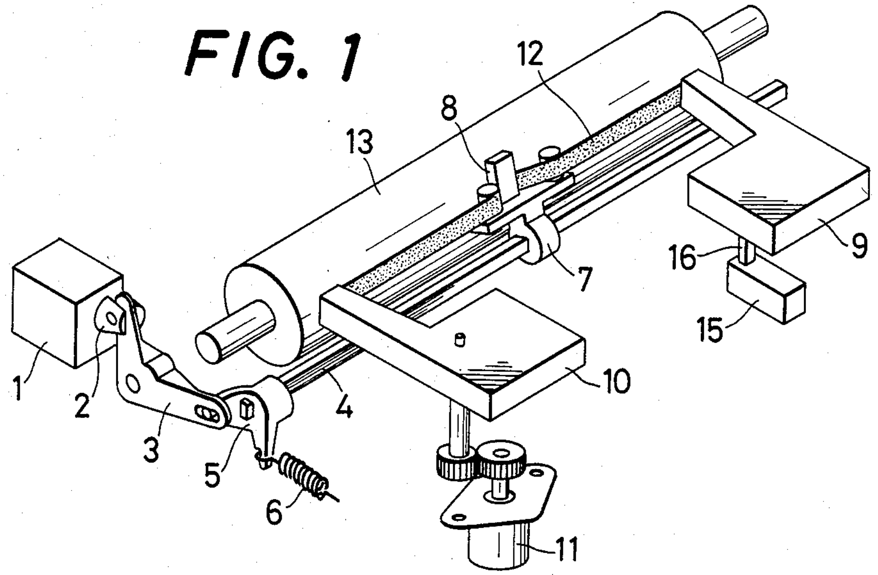
FIG. 1 is a perspective view of one embodiment of a printing apparatus of the invention using a micro switch as an example of detector means.
Figure 2A:
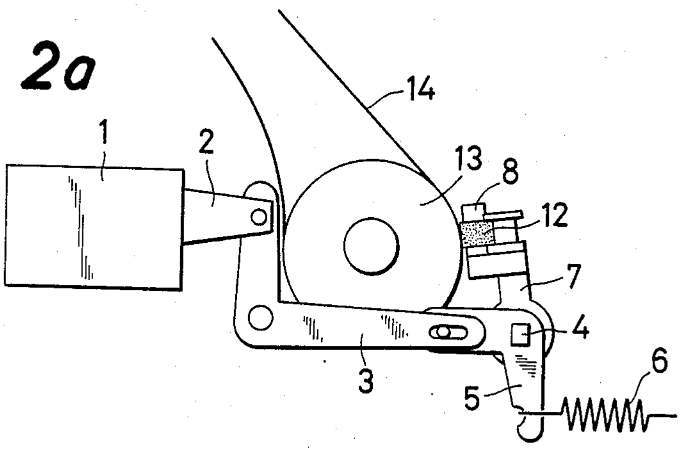
FIG. 2(*a*) is an enlarged cross sectional view of the printing apparatus of FIG. 1, showning a thermal print head while it is pressed against a platen.
Figure 2B:
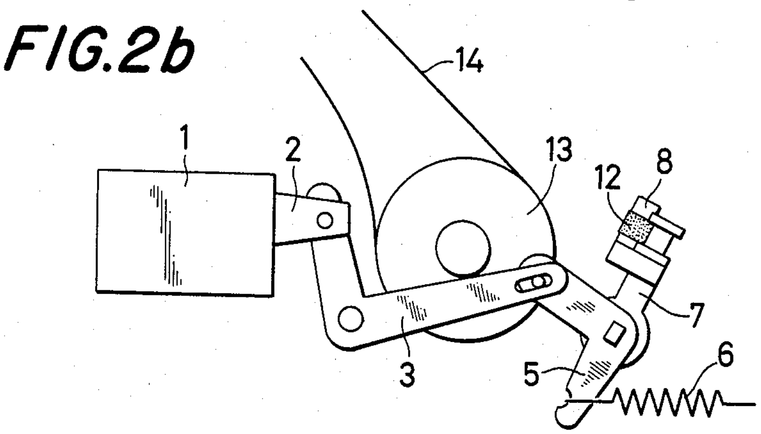

Referring now to the accompanying drawings, there is shown in FIGS. 1 and 2(*a*) and (*b*) a printing apparatus in one preferred form of the invention, which comprises a solenoid 1 having a plunger 2 which is operatively connected to a guide bar 4 through a first and a second pivotable lever 3, 5. One arm of the first lever 3 is connected to the external end of the plunger 2, and the other arm of the first lever 3 engages one arm of the second lever 5. This second lever 5 is fixed to the guide bar 4 such that the pivotal movement of the second lever 5 about the axis of the guide bar 4 will cause the latter to be rotated. The second lever 5 is biased by a spring 6 in a counterclockwise direction as viewed in FIG. 2(*a*). The guide bar 4 extends through a carriage 7 so that the carriage 7 is supported slidably on the guide bar 4. The carriage 7 carries a thermal print head 8. While the solenoid is off (i.e., while the plunger 2 is at its extended position), the print head 8 is held under action of the spring 6 in pressed contact, via a thermal ribbon 12, with a sheet of paper 14 placed on a platen 13 extending along the guide bar 4, as illustrated in FIG. 2(*a*). This thermal ribbon 12 which has a thermally transferable ink layer, is fed at appropriate timings from a removable feed cassette 9 toward a removable take-up cassette 10 through rotation of a ribbon drive motor 11 operatively connected to a spool (not shown) of the take-up cassette 10.

A micro switch 15 is provided near the feed cassette 9 so that the switch 15 is turned on and off with movements its actuator plunger 16 which is operated upon depression thereof by the feed cassette 9 when the cassette 9 is installed in place.

Figure 3:
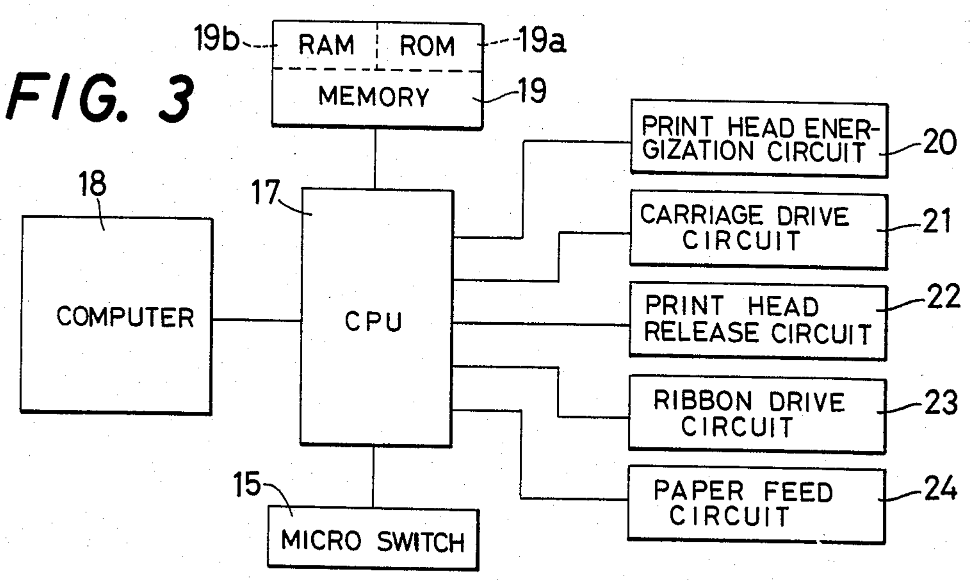
FIG. 3 is a schematic block diagram showing the same apparatus in connection with an external computer.

Referring next to FIG. 3, a control system of the printing apparatus is described below.

The control system comprises a computer consisting of a central processing unit (hereinafter referred to as CPU) 17 and a memory 19. The CPU 17 is connected to an external computer 18 in which is stored print data for printing desired pages of a text or lines of characters. The memory 19 includes a ROM (read-only-memory) 19*a* for storing a control program, dot-matrix pattern data representing characters to be printed, and so on, and further includes a RAM (random-access memory) 19*b* for storing the print data trasferred from the computer 18 via the CPU 17, and other kinds of data.

The control system further comprises: a PRINT HEAD ENERGIZATION circuit 20 for activating selected heat generating elements of the thermal print head 8; a CARRIAGE DRIVE circuit 21 for actuating a carriage drive (not shown) to move the thermal head 8 along the platen 13, this circuit 21 thus being considered to serve as a drive circuit for moving the thermal print head 8; a PRINT HEAD RELEASE circuit 22 for actuating the solenoid 1 to rotate the guide bar 4 in a clockwise direction, as shown in FIG. 2(*b*), for releasing the thermal print head 8 away from the platen 13; a RIBBON DRIVE circuit 23 for actuating the ribbon drive motor 11 to feed the thermal ribbon 12; and a PAPER FEED circuit 24 for actuating a paper feed drive (not shown) to rotate the platen 13 and other members so as to advance the sheet of paper 14 in a direction perpendicular to the axis of the platen 13. The above-indicated circuits 20–24 are all controlled by the CPU 17.

The micro switch 15 generates a CASSETTE ON signal when its plunger 16 is depressed by the bottom of the feed cassette 9, and this CASSETTE ON signal is fed to the CPU 17 to indicate that a printing operation is to take place through use of the thermal ribbon 12, that is, the paper sheet 14 is of an ordinary, non-heat-sensitive kind.

Figure 5:
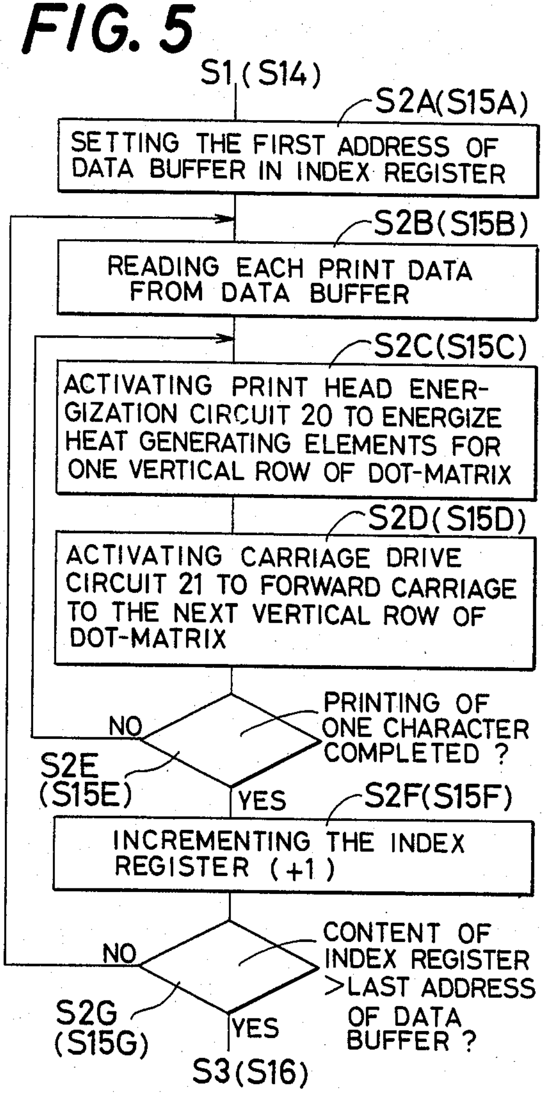
FIGS. 4, 5 and 6 are schematic operational flow diagrams representing a sequence of operation of the apparatus.
Figure 6:
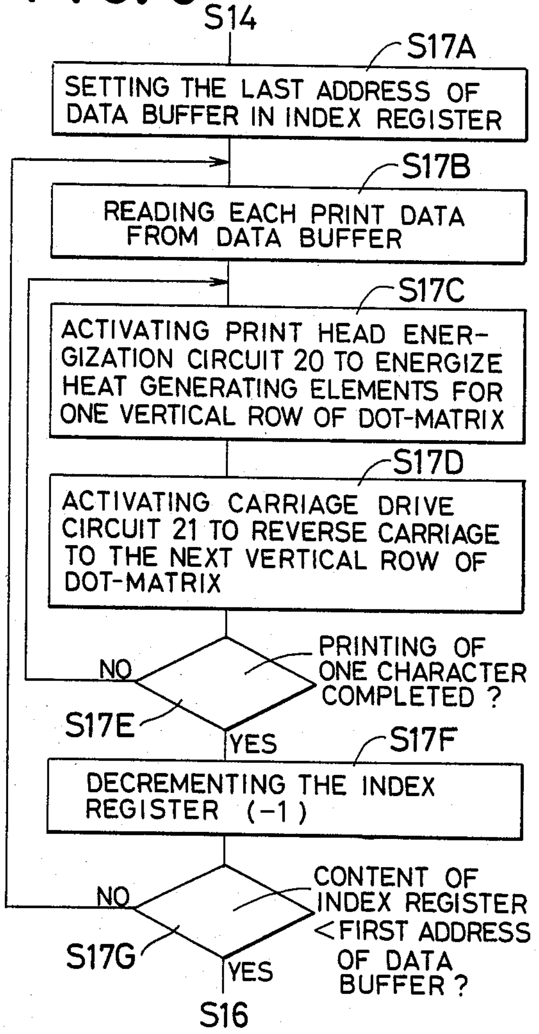
Figure 4:
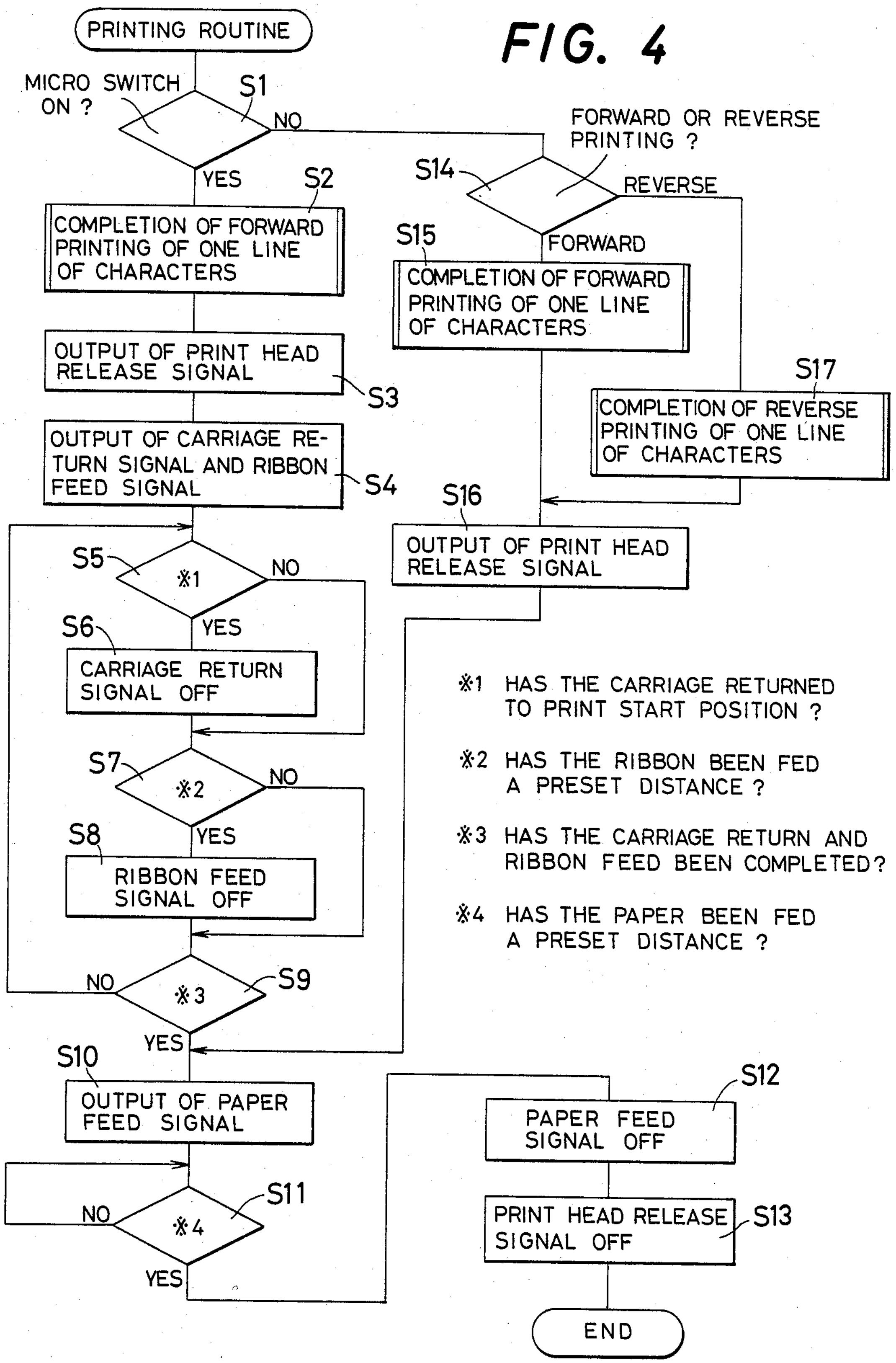

Referring further and particularly to FIGS. 4–6, the operation of the printing apparatus constructed as described hitherto will be explained.

Print data which has been stored in the computer 18 is first fed to the CPU 17 which in turn transfers the print data to the memory 19. When a set of print data corresponding to one line of characters has been stored in the memory 19, the CPU 17 sends an instruction to the computer 18 to suspend its output of the print data to the CPU 17. Thus, the transfer of the print data from the computer 18 to the CPU 17 is temporarily stopped.

When it is desired to effect a printing on the ordinary non-heat-sensitive paper 14 by means of the thermal ribbon 12, the feed and take-up cassettes 9 and 10 are installed in place, as shown in FIG. 1. As a result, the plunger 16 of the micro switch 15 is depressed and the micro switch 15 is turned on, whereby the CASSETTE ON signal is fed to the CPU 17. The presence of this signal is checked in Step S1 as depicted in FIG. 4. For easier understanding, Steps S1–S17 used in FIGS. 4–6 will be referred to in the following description.

Upon reception of the CASSETTE ON signal which establishes a "unidirectional printing" mode, the CPU 17 will operate as follows, starting in Step S2 which is shown in detail in FIG. 5:

At first, the initial or first address of a data buffer of the memory 19 (RAM) is set in an index register (S2A), so that the stored print data for the first line of characters is sequentially read out from the data buffer of the memory 19. Then, the print data for the first character is read out into the CPU 17 (S2B) and executed to print the first character (S2C, S2D and S2E). More specifically, the CPU 17 reads out the appropriate dot-matrix pattern data from the ROM of the memory 19, and provides the PRINT HEAD ENERGIZATION circuit 20 with PRINT HEAD ENERGIZATION signals according to the dot-matrix pattern data (S2C), in order to energize the appropriate heat generating elements of the thermal print head 8 which has been placed in pressed contact, under action of the spring 6 (with the solenoid 1 held off and its plunger 2 in its extended position), with the paper sheet 14 via the thermal ribbon 12. Successively, in Step S2D, the CPU 17 feeds a CARRIAGE FEED signal to the CARRIAGE DRIVE circuit 21 to move the carriage 7 (i.e., thermal print head 8) in the forward direction (from the left to the right) by a distance equal to a spacing between vertical rows of dots of a matrix pattern (e.g., $5\times7$ dot-matrix pattern). The above Steps S2C and S2D are repeated until all vertical rows of dots of the character pattern have been thermally printed by the print head, and the judgement in Step S2E becomes "YES". When the printing of the character is completed, the index register is incremented (S2F), and the next set of print data is executed in the same manner as described above. This sequence of operation is repeated until the content of the index register has exceeded the last address of the data buffer (S2G).

Upon completion of the printing of each line of characters (S2), the control goes to Step S3 (FIG. 4) wherein the CPU 17 feeds a PRINT HEAD RELEASE signal to the PRINT HEAD RELEASE circuit 22 to turn on the solenoid 1, whereby the plunger 2 is retracted with a result of rotating the guide bar 4 to release the thermal print head 8 away from the paper sheet 14 (platen 13). Then, in Step S4, the CPU 17 feeds a CARRIAGE RETURN signal to the CARRIAGE DRIVE circuit 21, and a RIBBON FEED signal to the RIBBON DRIVE circuit 23. In consequence, the carriage 7 and the print head 8 are returned to the print start position (S5, S6) while the print head 8 is held away from the paper sheet 14. Simultaneously, the ribbon drive motor 11 is operated to feed the thermal ribbon 12 from the feed cassette 9 toward the take-up cassette 10 to wind the used portion of the ribbon in the take-up cassette 10 and to provide a fresh portion of the ribbon in front of the sheet 14 (S7, S8). After checking the carriage return and ribbon feed (S9), a PAPER FEED signal is applied to the PAPER FEED circuit 24 (S10) to rotate the platen 13 until the sheet 14 is advanced by a distance of one-line spacing (S11, S12). Then, the PRINT HEAD RELEASE signal which has been applied to the circuit 22 is removed (S13), whereby the solenoid 1 is turned off and the thermal ribbon 12 is forced against the paper sheet 14 by the thermal print head 8 with a resilient force of the spring 6. Thus, a printing routine for one line of characters has been completed.

With the printing routine for the first line of characters has been executed, the CPU 17 calls for the next set of print data stored in the computer 18, and this set of print data for the next line of characters is stored in the memory 19 and the next printing routine (S2–S13) is executed as discussed above. Thus, the printing routine is repeated in the "unidirectional printing" mode for the individual lines of characters, that is, the printing on the sheet of ordinary paper 14 through use of the thermal ribbon 12 is effected always in the forward (rightward) direction for all lines of characters.

When it is desired to print out the stored print data on a sheet of heat-sensitive paper 14 in place of the ordinary non-heat-sensitive paper sheet 14, the feed and take-up cassettes 9, 10 are removed from the printer, so that the printing is carried out by the thermal print head 8 directly on the heat-sensitive paper 14, without using the thermal ribbon 12. The removal of the feed cassette 9 permits the plunger 16 of the micro switch 15 to move to its extended position, thereby causing the micro switch to be turned off (S1). Thus, the CASSETTE ON signal which has been applied to the CPU 17 is removed. As a result, the CPU 17 is placed in a "bidirectional printing" mode and a printing is performed in the following manner.

The first set of print data for the first line of characters is stored in the memory 19 as previously indicated. Since the CASSETTE ON signal is not present in this instance, the control goes from Step S1 to Step S14 wherein the direction of printing for each line is checked. In this specific embodiment, it is designed that the first line is always printed in the forward (rightward) direction. Therefore, the Step S14 is followed by Step S15 which is identical to the previously described Step S2 (illustrated in detail in FIG. 5). Thus, the first line is printed in the forward direction. At the end of that line, the thermal print head 8 is released away from the paper sheet 14 (S16 identical to S3), and the paper sheet 14 is fed to the next line (S10–S12). Then, the thermal print head 8 is again forced into pressed contact with the paper sheet 14 (S13).

It is noted here that the print data which has been read out from the memory 19 contains space data corresponding to a proper number of successive spaces which are necessary to move the print head 8, from the last printed character position to the rightmost position of the first line, if the last printed character is not located at the rightmost position of the line. Such space data is included in the print data by the external computer 18 before the print data is transferred to the memory 19. Therefore, the carriage 7 (print head 8) is located at the rightmost position of the first line upon completion of Step S15 (S2), i.e., before Steps S16 is executed. In other words, each of the spaces defined by the space data is considered and processed as a character.

When the print data for the second line of characters has been stored in the memory 19, the direction of printing for this line is determined in Step S14. Since, at this point of time, the carriage 7 is located at the rightmost position of the second line, the printing direction for the second line is determined to be in the reverse (leftward) direction. Accordingly, the control goes from Step S14 to Step S17, and the second line is printed in the reverse direction as illustrated in detail in FIG. 6. The print data is read out and executed in the reverse direction (S17A–D) and the carriage 7 is moved in the reverse direction (S17D), until the content of the index register has become smaller than the first address of the data buffer (S17G). Due to the difference in the printing direction, Steps S17A, S17D, S17F and S17G are different from the corresponding steps (shown in FIG. 5) for the forward printing Step S15 (S2).

The print data for the second line also contains space data necessary to move the print head 8 to the leftmost position of the second line, if the leftmost position at which the last character has been printed is not located at the leftmost position of the second line. Thus, the carriage 8 at the printing end of each printed line is always moved to the rightmost or leftmost position of that printed line in the direction in which the characters in the line have been printed.

Upon completion of the printing of the second line (S17G), the control goes to Steps S16, and S10–13, to prepare for printing the third line.

When the print data for the third line has been transferred to the memory 19 from the computer 18 via the CPU 17, the printing direction for the third line is again determined in Step S14. At this time, the print head 8 is located at the leftmost position of the third line, and consequently the printing direction for this line is determined to be in the forward direction, as in the first line, whereby the control goes to Step S15 for forward printing of the third line.

As indicated above, Steps S15 and S17 are executed alternately to print the individual lines of characters in alternately opposite directions, one line in the forward direction, and the following line in the reverse direction. Thus, the printing on a sheet of heat-sensitive paper is effected in the "bidirectional printing" mode.

While the present invention has been described in its preferred embodiment, it is to be understood that the invention is not limited thereto but may be otherwise embodied within the scope of the appended claims.

For example, the micro switch 15 and the feed cassette 9 which are used as detector means for sensing the thermal ribbon 12, may be replaced by other detector means such as a photoelectric detector which is capable of sensing the thermal ribbon 12 placed in its operable position.

Although the successive lines of characters are printed in alternately opposite directions in the "bidirectional printing" mode in the above described embodiment, the term "bidirectional printing" should not be construed to mean only the manner of printing in which the printing direction is reversed at the end of each line; but may include a more efficient and commonly practiced manner of printing in which the carriage 8 at the last printed character position of each line is moved (usually at a rapid traverse rate) to the leftward or rightward end of the next line which is closer to said last printed character position, that is, the printing direction of a line is determined based on the printing end of the preceding printed line relative to the first and last (leftmost and rightmost) character positions of the line to be printed, so that a minimum non-printing time is spent between the printings of the two adjacent lines. Thus, while the micro switch 15 is off, i.e., while a printing is effected on heat-sensitive paper in the bidirectional printing mode, the printing may take place in either one of the forward and reverse directions (S15 or S17).

What is claimed is:

1. A printing apparatus which has a thermal print head movable along a platen and which is adapted to hold a thermal ribbon having a thermally transferable ink layer, wherein a printing on a sheet of non-heat-sensitive paper is effected by said thermal print head through said thermal ribbon, while a printing on a sheet of heat-sensitive paper is effected directly by the thermal print head without using said thermal ribbon, said printing apparatus comprises:

a drive circuit for moving said thermal print head along said platen in selected one of opposite longitudinal directions of the platen upon each printing movement for printing each line of characters on the paper;

detector means for sensing the presence of said thermal ribbon at its predetermined position for checking if said thermal ribbon is usable or not, said detector means generating a signal according to the presence and absence of said thermal ribbon at said predetermined position; and control means, responsive to said signal from said detector means, for selecting a unidirectional printing mode in which the printing movements of said thermal print head take place in a predetermined one of said opposite longitudinal directions for all lines of characters to be printed, or a bidirectional printing mode in which the printing movements of the same may take place in either one of said opposite longitudinal directions, said control means controlling said drive circuit to operate in said unidirectional printing mode while said thermal ribbon is sensed by said detector means, and to operate in said bidirectional printing mode while said ribbon is not sensed by said detector means.

2. A printing apparatus as recited in claim 1, further comprising another drive circuit for feeding said thermal ribbon each time a line of characters has been printed, said control means controlling said another drive circuit to operate to feed said thermal ribbon only while said thermal ribbon is sensed by said detector means.

3. A printing apparatus as recited in claim 1, wherein said detector means senses the presence of holder means removably installed for holding said thermal ribbon.

4. A printing apparatus as recited in claim 3, wherein said holder means comprises a feed cassette accommodating a roll of said thermal ribbon.

5. A printing apparatus as recited in claim 3, wherein said detector means comprises a micro switch having an actuator plunger which is operated by said holder means.

6. A printing apparatus as recited in claim 1, wherein said control means comprises a central processing unit incorporated in a computer.

* * * * *